United States Patent
Song et al.

(10) Patent No.: US 12,332,691 B2
(45) Date of Patent: Jun. 17, 2025

(54) BATTERY PACK RETENTION SYSTEMS FOR MOBILE COMPUTING DEVICES

(71) Applicant: ZEBRA TECHNOLOGIES CORPORATION, Lincolnshire, IL (US)

(72) Inventors: Zichun Song, Cedar Park, TX (US); David William Reber, Cedar Park, TX (US); Mark Thomas Fountain, Hitchin (GB); Lawrence Allen Stone, Austin, TX (US)

(73) Assignee: Zebra Technologies Corporation, Lincolnshire, IL (US)

( * ) Notice: Subject to any disclaimer, the term of this patent is extended or adjusted under 35 U.S.C. 154(b) by 296 days.

(21) Appl. No.: 18/115,255

(22) Filed: Feb. 28, 2023

(65) Prior Publication Data

US 2024/0288900 A1    Aug. 29, 2024

(51) Int. Cl.
  *G06F 1/16* (2006.01)
  *H01M 50/264* (2021.01)
  *H05K 5/00* (2025.01)
  *H05K 7/00* (2006.01)
  *H01M 50/247* (2021.01)

(52) U.S. Cl.
  CPC .......... *G06F 1/1635* (2013.01); *G06F 1/1679* (2013.01); *H01M 50/264* (2021.01); *H01M 50/247* (2021.01); *H01M 2220/30* (2013.01)

(58) Field of Classification Search
  CPC ............ H01M 50/264; H01M 50/247; H01M 50/262; H01M 50/20; G06F 1/1635; G06F 1/1679; G06F 1/1633; G06F 1/1675
  See application file for complete search history.

(56) References Cited

U.S. PATENT DOCUMENTS

| | | | | |
|---|---|---|---|---|
| 6,376,931 B1* | 4/2002 | Kim | ...................... | G06F 1/1635 307/64 |
| 6,535,378 B1* | 3/2003 | Oguchi | ................... | G06F 1/166 361/679.55 |
| 6,617,063 B1* | 9/2003 | Ohnishi | .............. | H01M 50/284 429/97 |
| 6,806,681 B1* | 10/2004 | Cheiky | .................... | G03B 7/26 396/539 |
| 7,333,324 B2* | 2/2008 | DeLuga | ................ | G06F 1/1656 361/679.55 |
| 7,835,150 B2* | 11/2010 | Degner | ................. | G06F 1/1635 361/679.58 |
| 9,001,506 B2* | 4/2015 | Chen | ..................... | G06F 1/1616 361/679.55 |
| 2007/0030635 A1* | 2/2007 | Song | ..................... | G06F 1/1616 361/679.55 |
| 2011/0318622 A1* | 12/2011 | Hsiung | ............... | H01M 50/209 429/100 |

* cited by examiner

*Primary Examiner* — Anthony M Haughton

(57) ABSTRACT

A computing device includes: a housing defining a battery chamber; an electrical contact disposed on a wall of the battery chamber; a latch extending into the battery chamber, the latch movable between (i) a first position to retain a battery pack within the battery chamber and engage the battery pack with the electrical contact, and (ii) a second position to disengage from the battery pack; an auxiliary retainer in communication with the battery chamber, the auxiliary retainer configured to retain the battery pack within the battery chamber, independently of the latch, via engagement with a complementary retaining structure of the battery pack.

18 Claims, 12 Drawing Sheets

BATTERY PACK RETENTION SYSTEMS FOR MOBILE COMPUTING DEVICES

BACKGROUND

Certain computing devices, such as tablet computers, can be provided with battery packs that are removable by operators of the devices, e.g., to recharge or replace a depleted battery. Such a computing device may be provided with a fastening mechanism for coupling the battery pack to the computing device. Disabling the fastening mechanism, e.g., by an operator of the computing device to replace the battery, may lead to the battery pack falling from the computing device, which may in turn result in damage to the battery pack.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
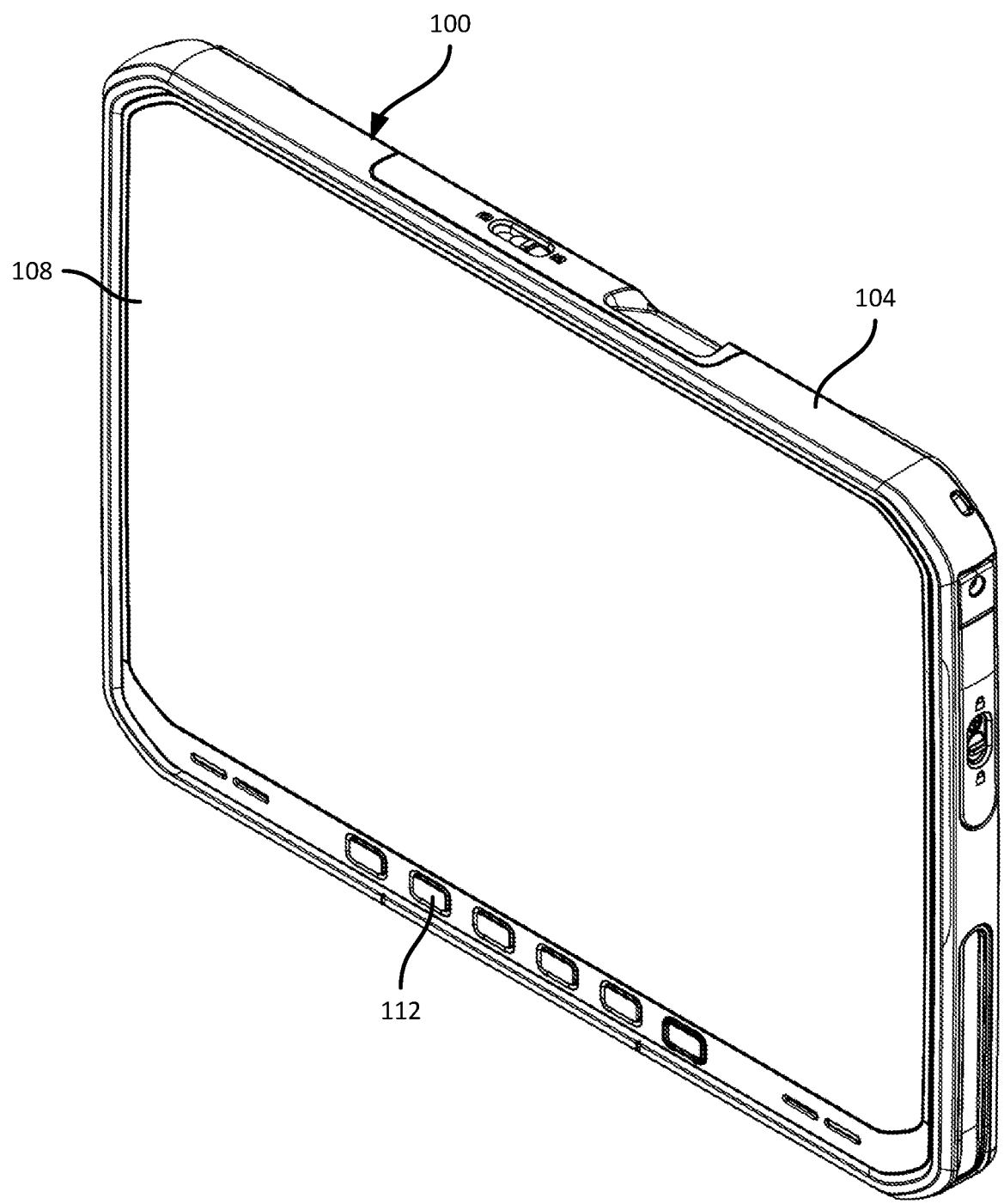
FIG. 1 is a front perspective view of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device, comprising: a housing defining a battery chamber; an electrical contact disposed on a wall of the battery chamber; a latch extending into the battery chamber, the latch movable between (i) a first position to retain a battery pack within the battery chamber and engage the battery pack with the electrical contact, and (ii) a second position to disengage from the battery pack; an auxiliary retainer in communication with the battery chamber, the auxiliary retainer configured to retain the battery pack within the battery chamber, independently of the latch, via engagement with a complementary retaining structure of the battery pack.

Additional examples disclosed herein are directed to a system, comprising: a battery pack including: a body containing one or more battery cells; a hook extending from the body; and a retaining wall extending from the body; and a computing device including: a housing defining a battery chamber configured to removably receive the battery pack; a latch extending into the battery chamber, the latch movable between (i) a first position to engage with the hook to retain the battery pack within the battery chamber and engage the battery pack with the electrical contact, and (ii) a second position to disengage from the battery pack; and an auxiliary retainer in communication with the battery chamber, the auxiliary retainer configured to engage with the retaining wall to retain the battery pack within the battery chamber, independently of the latch, via engagement with a complementary retaining structure of the battery pack.

FIG. 1 illustrates a mobile computing device 100 (also referred to herein as the device 100), such as a tablet computer. In other examples, the computing device 100 can be implemented in other form factors, including as a smartphone, a wrist-mounted mobile computer, a laptop computer, or the like. The device 100 includes a housing 104 supporting various other components of the device 100, such as a display 108 disposed on a front of the device 100 (e.g., a side of the device 100 configured to face an operator of the device 100). The housing 104 can also support various other components, including function buttons 112, and the like, as well as various internal components of the device 100.

Figure 2:
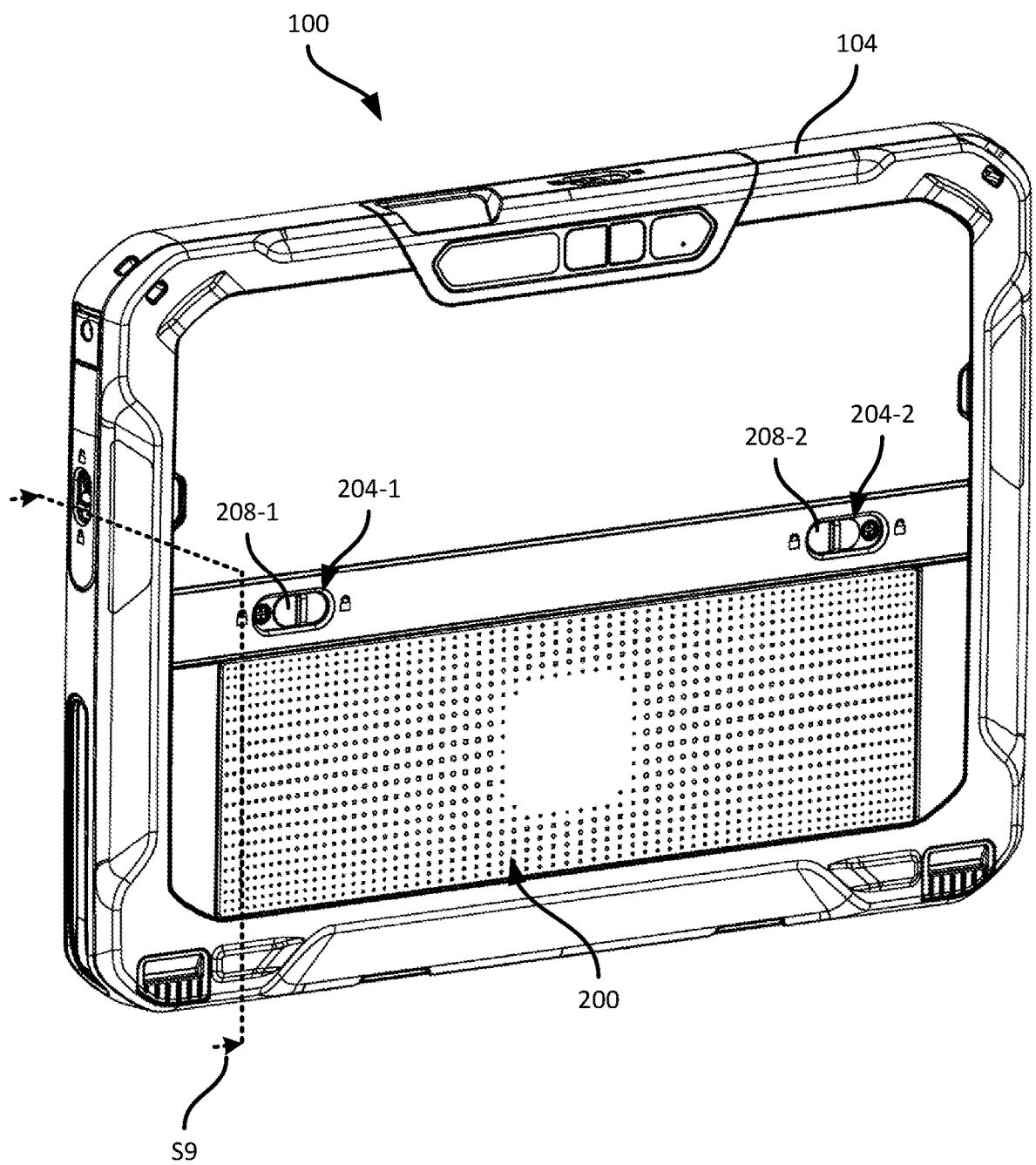
FIG. 2 is a rear perspective view of the mobile computing device of FIG. 1, with a battery pack installed.

Some components of the device 100, including for example a computing subsystem (e.g., including one or more processors, memory circuits, and the like) are electrically powered. Turning to FIG. 2, which illustrates a back of the device 100 (e.g., opposite the display 108), the device 100 can carry a battery pack 200 (also referred to herein as the battery 200), including a body housing one or more rechargeable cells. The battery 200 is removably supported by the housing 104, to facilitate replacement of the battery 200 with another battery, e.g., to recharge the battery 200. The device 100 includes, among other battery retention components, at least one latch. In the present example, the device 100 includes latches 204-1 and 204-2 (collectively referred to as the latches 204, and generically referred to as a latch 204; similar nomenclature is also used elsewhere herein for components of which the device 100 includes multiple instances).

The latches 204 are movable between first (e.g., latched) and second (e.g., unlatched) positions. In the first position, shown in FIG. 2, in which the latches 204 retain the battery 200 in an engaged position relative to the device 100, to supply the device 100 with electrical power. The latches 204 may be moved to the second position via manipulation of actuators 208-1 and 208-2 (e.g., sliders exposed at a rear wall of the device 100). In the second position, the latches 204 disengage with the battery 200, facilitating removal of the battery 200 from the device 100.

In some computing devices, unlatching a battery pack may lead to accidental dropping of the battery pack, as the battery pack is no longer secured to the computing device. Dropping the battery pack may lead to damage and/or loss of the battery pack. As discussed below, the device 100 and the battery 200 include various structural features to mitigate the risk of dropping the battery 200 when the battery 200 is disengaged from the device 100.

Figure 3:
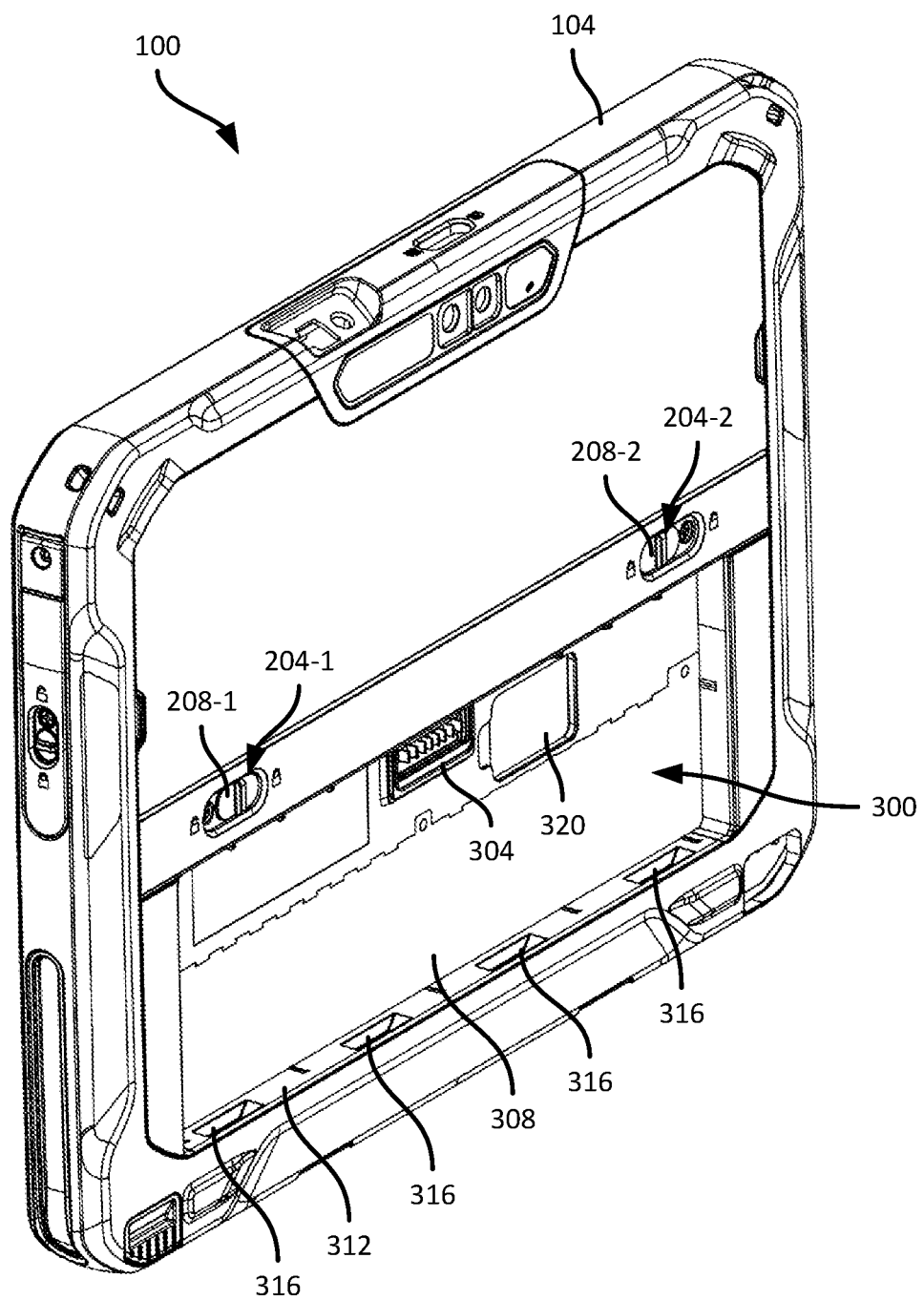
FIG. 3 is a rear perspective view of the mobile computing device of FIG. 2, with the battery pack removed.

Referring to FIG. 3, the device 100 is shown from the back, with the battery 200 removed to reveal a battery compartment or battery chamber 300, defined by the housing 104. The chamber 300 extends into the housing 104, such that an outer wall of the battery 200 lies substantially flush with the back of the device 100 when the battery 200 is coupled with the device 100 (as shown in FIG. 2). The chamber 300 includes an electrical contact or set of electrical contacts 304, e.g., disposed on an inner wall 308 of the chamber 300, substantially parallel with the display 108. The contacts 304 can be disposed on other surfaces within the chamber 300, in other examples. The chamber 300 also includes, e.g., on a lower wall 312, one or more recesses 316. In the present example, the chamber 300 includes four recesses 316, each configured to receive a corresponding protrusion of the battery 200, discussed further below.

As also shown in FIG. 3, the chamber 300 can include a storage device compartment 320, e.g., accessible when the battery 200 has been removed. The compartment 320 can contain one or more removable storage devices, such as flash memory cards (e.g., SD cards), or the like.

Figure 4:
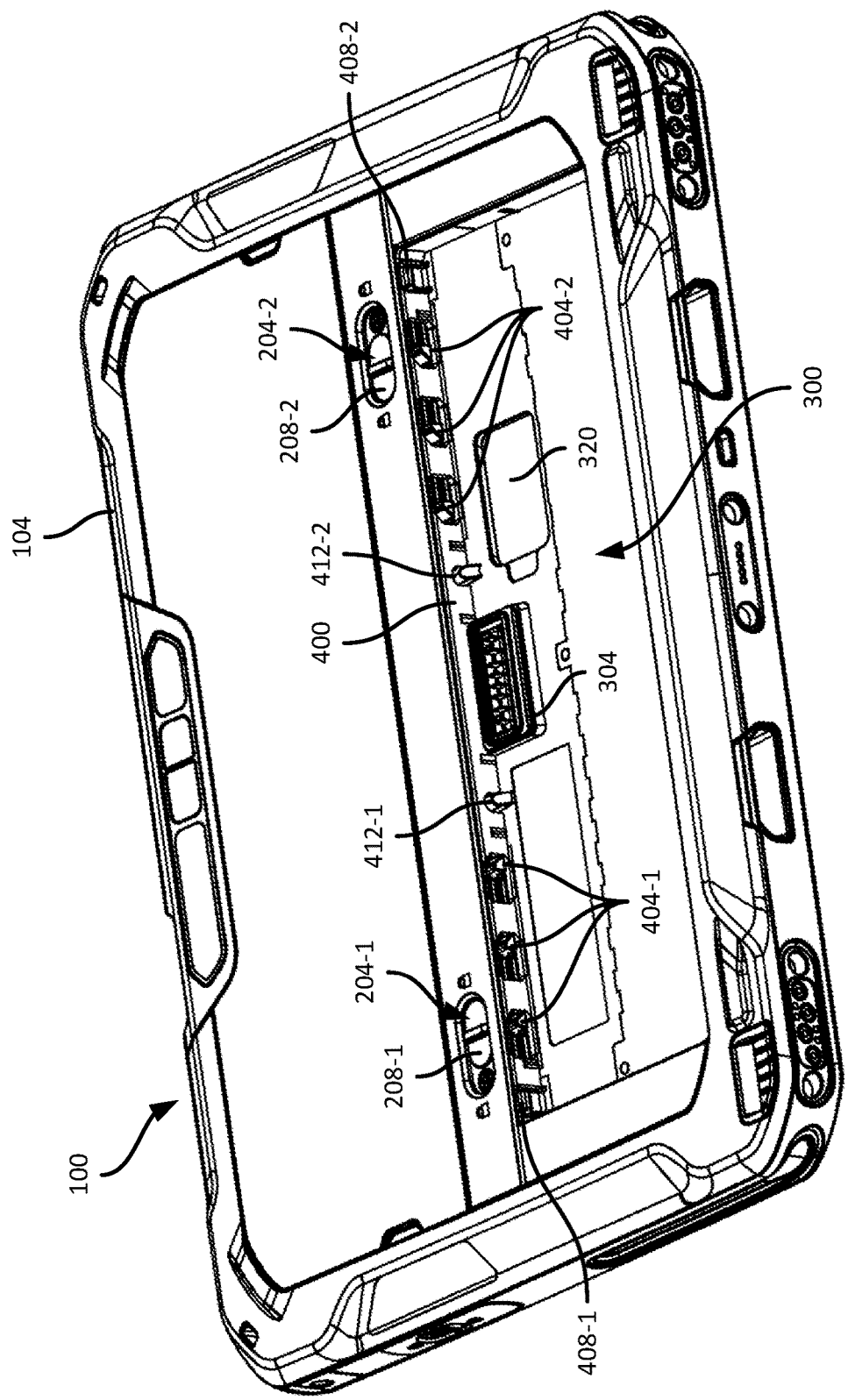
FIG. 4 is another rear perspective view of the mobile computing device of FIG. 2, with the battery pack removed.

Turning to FIG. 4, an upper wall 400 of the chamber 300 is visible, opposite the lower wall 312. The upper wall 400 includes openings therein through which posts 404-1 and 404-2 of the latches 204-1 and 204-2, respectively, extend into the chamber 300. The posts 404 are therefore, in this example, disposed on an opposite wall of the chamber 300 from the recesses 316. Together, the recesses 316 and the posts 404 engage with opposing walls of the battery 200 to retain the battery 200 within the chamber 300. In the present example, the latch 204-1 includes three posts 404-1 mechanically coupled with the actuator 208-1, and the latch 204-2 includes three posts 404-2 mechanically coupled with the actuator 208-2. Smaller or greater numbers of posts 404 can be implemented in other examples. In response to manipulation of the actuators 208, the posts 404 move between the first, or latched, position as shown in FIG. 4, and the second, or unlatched, position.

The chamber 300 also contains auxiliary retainers 408-1, and 408-2, e.g., disposed adjacent to opposing sides of the chamber 300 (the sides being walls of the chamber 300 extending between the upper wall 400 and the lower wall 312). In other examples, the auxiliary retainers 408 can be disposed further from the sides of the chamber 300. Further, while the auxiliary retainers 408 are on the upper wall 400, thus sharing the upper wall 400 with the latches 204, in other examples the auxiliary retainers 408 can be disposed on a different wall of the chamber 300.

The auxiliary retainers 408, as discussed below, are configured to engage with certain structures of the battery 200, to couple the battery 200 with the device 100 even when the latches 204 are unlatched. More specifically, the auxiliary retainers 408 permit the battery 200 to be partially disengaged from the device 100, e.g., by unlatching the latches 204 and permitting the battery 200 to disengage with the contacts 304 (thus ceasing to deliver power to the device 100), while preventing the battery 200 from falling out of the chamber 300 entirely, regardless of the current orientation of the device 100. That is, if the device 100 is held with the display 108 facing substantially upwards, and the latches 204 are unlatched, the auxiliary retainers 408 serve to prevent the battery 200 from falling out of the chamber 300 under the action of gravity.

The device 100 can also include lifting elements 412-1 and 412-2, configured to extend into the chamber 300. The lifting elements 412 are movable between an extended, or lifting, position as shown in FIG. 4, and a retracted, or idle, position. In the lifting position, the lifting elements 412 are configured to engage with the battery 200 to push the battery 200 partially out of the chamber (with the auxiliary retainers 408 preventing the battery 200 from falling from the chamber 300). The lifting elements 412 can, in other words, partially disengage the battery 200 from the device 100 to assist in the removal of the battery 200. When the battery 200 is installed and the latches 204 are in the latched position, the lifting elements 412 are pushed into the retracted, or idle, position, where they remain until the latches 204 are unlatched.

Figure 5:
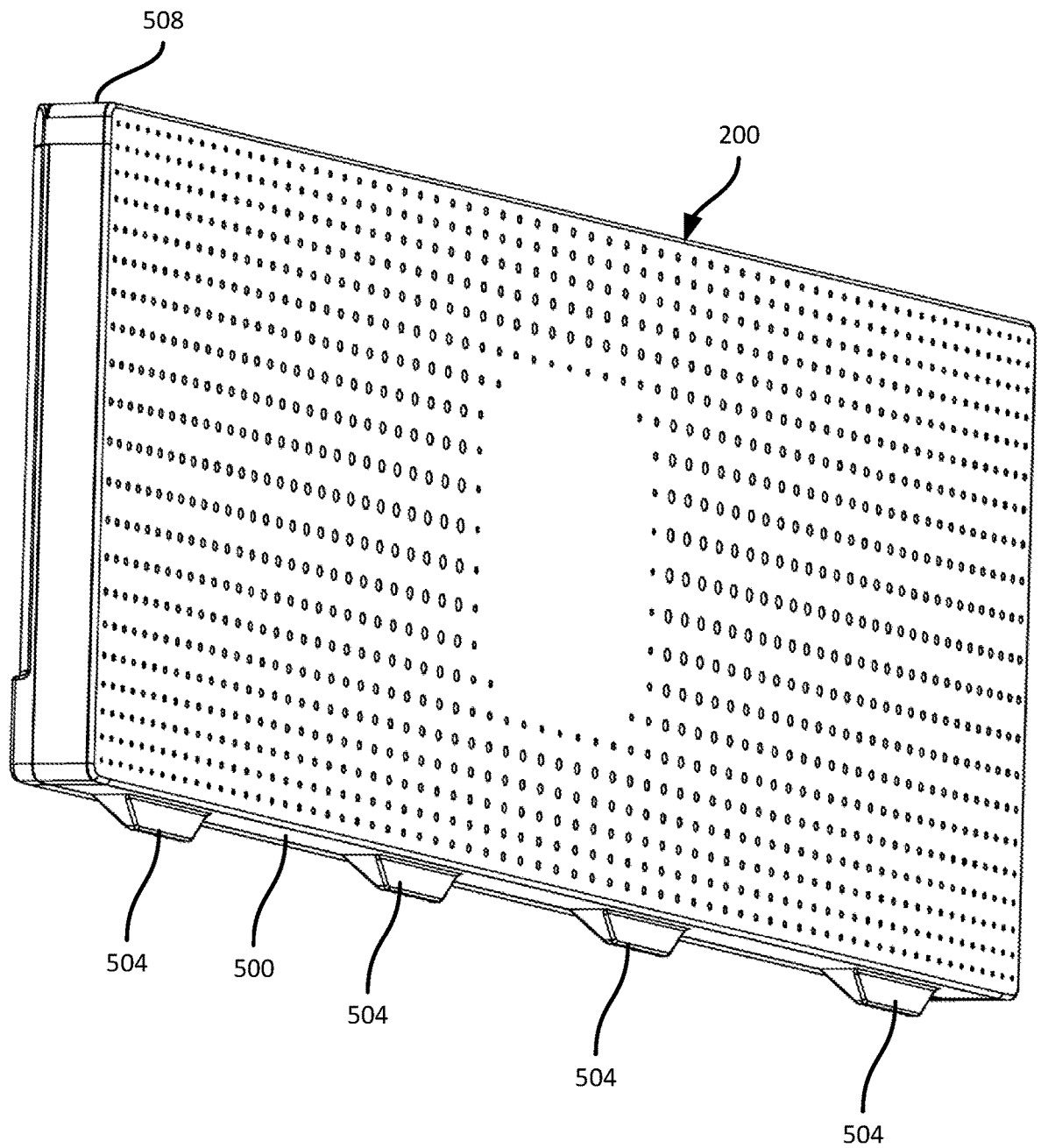
FIG. 5 is an outer perspective view of the battery pack of FIG. 2.

Turning to FIG. 5, the battery 200 is shown in isolation, from a back or outer side (e.g., the face of the battery 200 that remains exposed when the battery 200 is installed in the chamber 300). The battery 200 includes, on a lower wall 500 thereof, at least one protrusion 504, such as a wedge-shaped fin or blade. In the present example, the battery 200 includes four protrusions 504, each corresponding to one of the recesses 316 in the lower wall 312 of the chamber 300. Installation of the battery 200 in the chamber 300 can begin, for example, by placing the protrusions 504 in the recesses 316 before rotating an upper wall 508 of the battery 200 into the chamber 300 about an axis adjacent to the lower wall 500.

Figure 6:
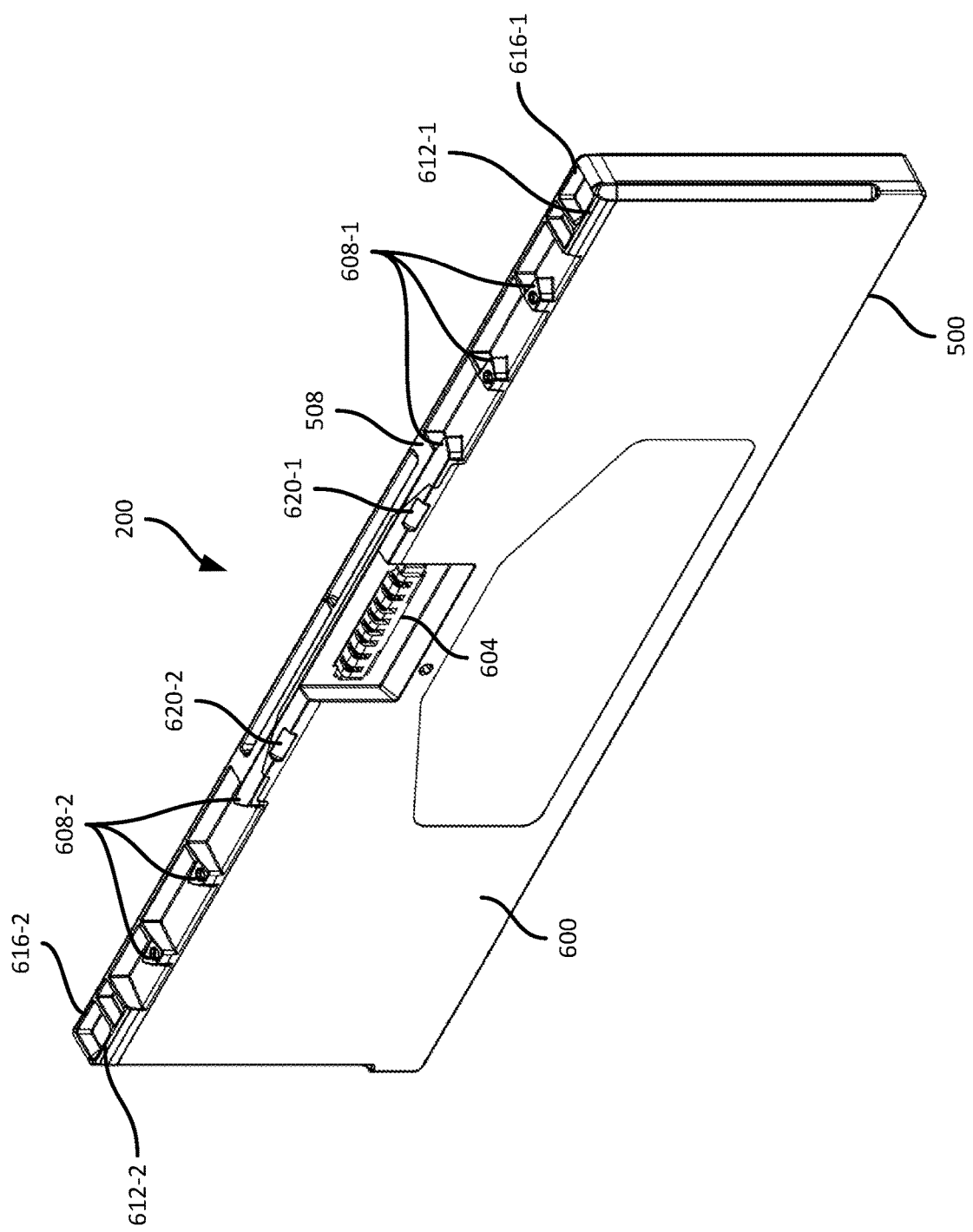
FIG. 6 is an inner perspective view of the battery pack of FIG. 2.

FIG. 6 illustrates a front or inside of the battery 200 (e.g., the face of the battery that faces into the chamber 300 when the battery 200 is installed). The battery 200 includes, on an inside wall 600, one or more battery contacts 604 configured to engage with the contacts 304 within the chamber 300, to deliver power from the battery 200 to the device 100. The battery 200 also includes, e.g., on the upper wall 508, one or more hooks 608-1, and one or more hooks 608-2, corresponding to the posts 404-1 and 404-2. In the present example, therefore, the battery 200 includes three hooks 608-1, and three hooks 608-2. The hooks 608 are configured to engage with the posts 404 when the latches 204 are in the latched position, to retain the battery 200 within the chamber 300 (e.g., with the contacts 304 and 604 engaged).

The battery 200 also includes retaining walls 612-1 and 612-2, configured to engage with the auxiliary retainers 408-1 and 408-2, respectively, to mitigate dropping of the battery 200 when the posts 404 are not engaged with the hooks 608. In the illustrated example, the retaining walls 612 are disposed adjacent to opposing sides of the battery 200, corresponding with the positions of the auxiliary retainers 408. In other examples, the retaining walls 612 can be disposed on the upper wall 508 in other positions, e.g., to match the positions of the auxiliary retainers 408 within the chamber 300.

The battery 200 also includes ledges 616-1 and 616-2 in line with the back of the battery 200 (whereas the retaining walls 612 are in line with the wall 600 of the battery 200). The ledges 616 can be disposed, as shown in FIG. 6, adjacent to opposing sides of the battery 200, but can also be placed at other locations on the upper wall 508. The ledges 616, as discussed below, facilitate grasping of the battery 200 (e.g., by an operator of the device 100) to fully remove the battery 200 from the chamber 300, overcoming resistance provided by the engagement between the auxiliary retainers 408 and the retaining walls 612.

Also shown in FIG. 6 are inclined strike surfaces 620-1 and 620-2, defined on the upper wall 508 of the battery 200. As discussed below, the strike surfaces 620 are configured to engage with the lifting elements 412 of the device 100.

Figure 7A:
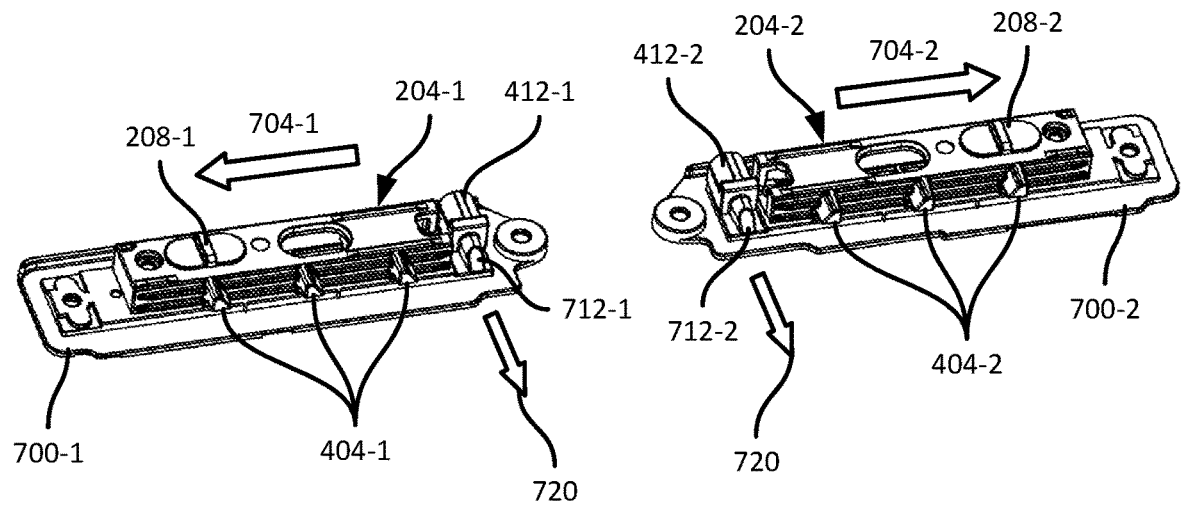
FIG. 7A is a diagram of a latching assembly of the mobile computing device of FIG. 2 in isolation, in a latched position.
Figure 7B:
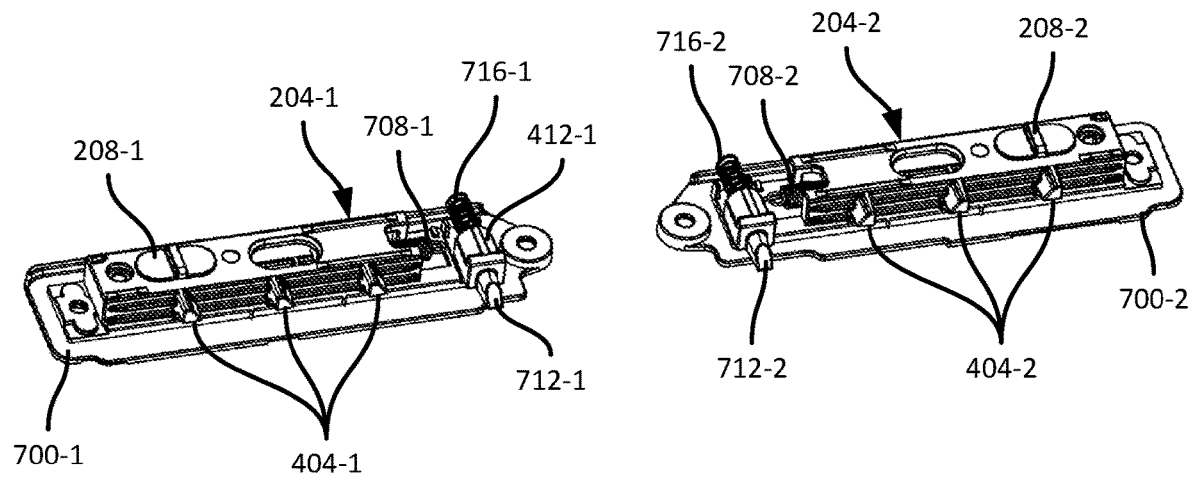
FIG. 7B is a diagram of a latching assembly of the mobile computing device of FIG. 2 in isolation, in an unlatched position.

Referring to FIGS. 7A and 7B, the latches 204 and lifting elements 412 are shown isolated from the remainder of the device 100. The latches 204 can be mounted within the housing 104, for example on respective latch covers 700-1 and 700-2 that are in turn affixed to interior surfaces of the housing 104. The latches 204 are slidably mounted on the covers 700, such that each latch 204 can slide between a first, latched, position as shown in FIG. 7A, and a second, unlatched, position as shown in FIG. 7B. In the present example, the latches 204 slide in opposing directions 704-1 and 704-2. As noted earlier, movement of the latches 204 (in the corresponding directions 704) can be effected by application of forces to the actuators 208-1 and 208-2. Each latch 204 can be biased towards the first position (that is, the latched position), e.g., by a bias element such as a spring 708-1, 708-2 coupled between the corresponding latch 204 and the cover 700 or other structure within the housing 104.

FIGS. 7A and 7B also illustrate the lifting elements 412 in a first, idle, position (FIG. 7A), and a second, lifting, position (FIG. 7B). The lifting elements 412 extend into the chamber 300, e.g., in a direction substantially parallel to the inner wall 308 of the chamber 300. In other examples, the lifting elements 412 can be disposed within the inner wall 308 itself, and extend into the chamber 300 in a direction substantially perpendicular to the inner wall 308.

As seen in FIG. 7A, in the idle position, the lifting elements 412 are withdrawn or retracted from the chamber 300. In the lifting position shown in FIG. 7B, however, the lifting elements 412 extend into the chamber 300. Each lifting element includes a wedge-shaped head 712-1, 712-2 with an angle complementary to that of the corresponding strike surface 620 of the battery 200. As will now be apparent, when the lifting elements 412 extend into the chamber in the lifting position (i.e., moving in a direction 720), the wedge-shaped heads 712 engage with the strike surfaces 620 of the battery 200, and lift the battery 200 away from the inner wall 308 of the chamber 300. This lifting action is permitted when the latches 204 are in the unlatched position.

When the latches 204 are in the latched position and the battery 200 is installed in the chamber 300, the latches 204 prevent the battery 200 from being lifted away from the inner wall 308, and the lifting elements 412 are retained in the idle position of FIG. 7A by the battery 200. The lifting elements 412 can be biased towards the extended, lifting position of FIG. 7B by respective bias elements 716-1, 716-2, such as springs.

Figure 8:
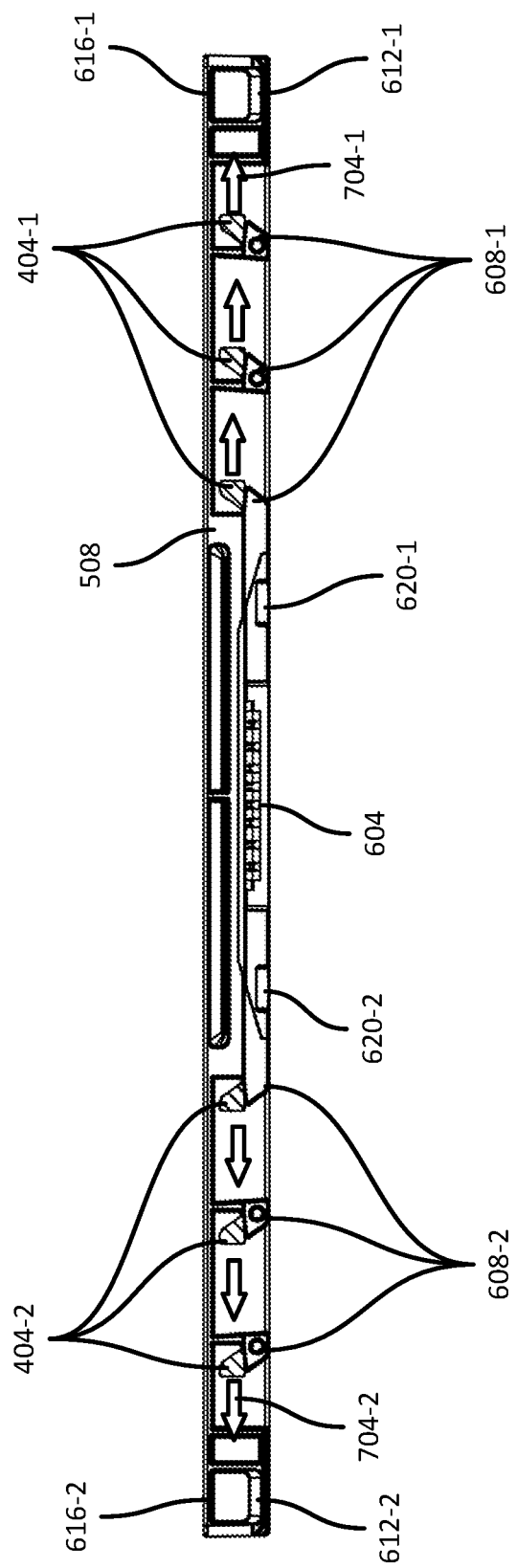
FIG. 8 is a top view of the battery of FIG. 6, with a cross-sectional view of latching posts of the latch assembly shown in FIGS. 7A and 7B.

FIG. 8 illustrates a top view of the battery 200 with a cross section of the posts 404, illustrating that when the posts 404 are in the first, latched, position, the hooks 608 of the battery 200 are compressed between the inner wall 308 of the chamber 300 and the posts 404. The battery 200 is therefore retained inside the chamber 300, with the battery contacts 604 engaged with the contacts 304 of the device 100. When the posts 404-1 and 404-2 are moved in the directions 704-1 and 704-2, respectively, the posts 404 are taken out of engagement with the hooks 608 (as the battery 200 includes empty spaces alongside each hook 608, as also shown in FIG. 6), permitting the battery 200 to move away from the inner wall 308.

Figure 9:
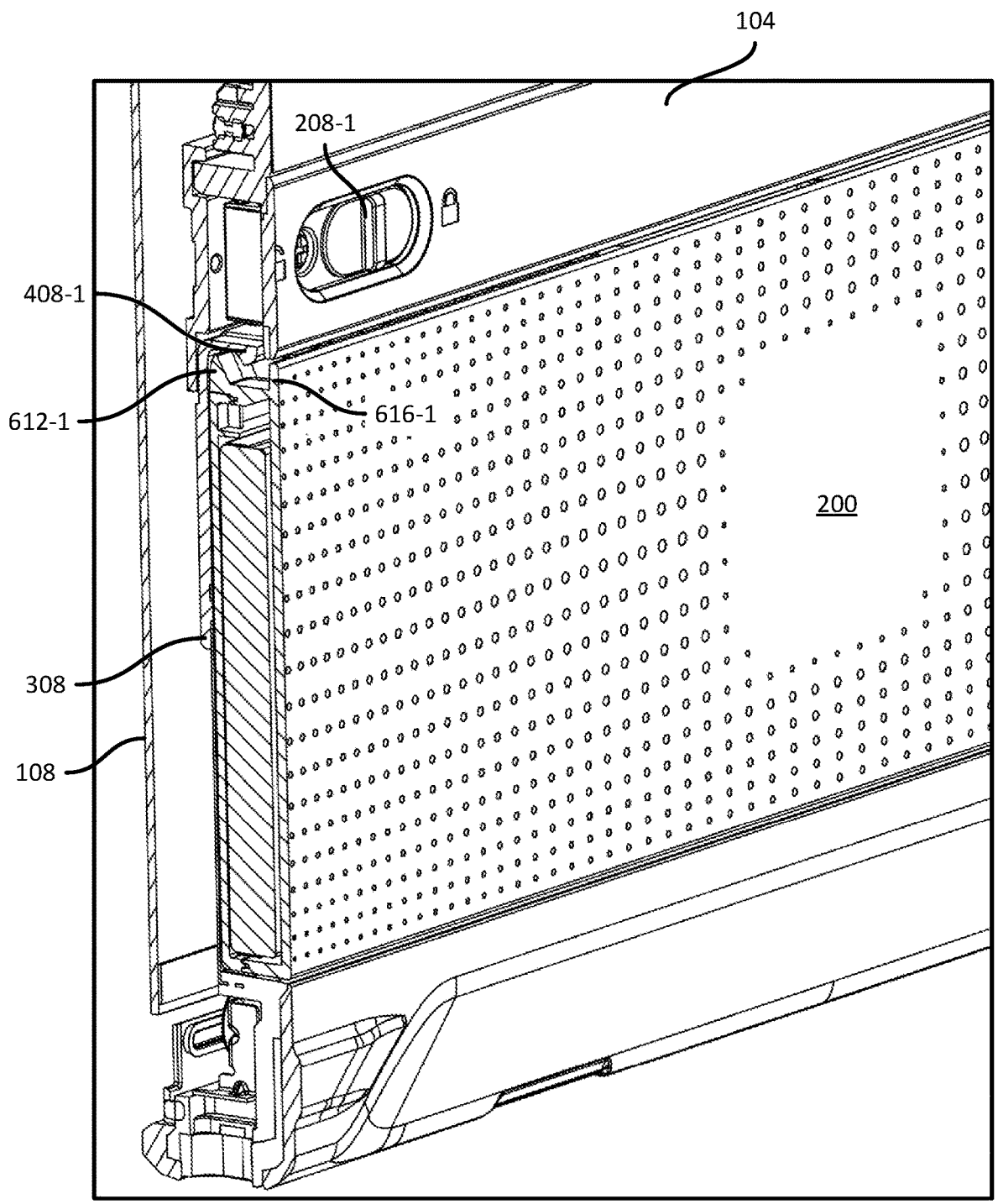
FIG. 9 is a partial cross section of the mobile computing device of FIG. 1, with the battery pack in an installed position.

Turning to FIG. 9, interactions between the various components noted above is discussed. FIG. 9 illustrates a partial cross section of the device 100 and battery 200, taken at the plane S9 labelled in FIG. 2. When the battery 200 is fully inserted in the chamber 300 and the latches 204 are in the latched position, as shown in FIG. 9, the battery 200 is held against the inner wall 308 of the chamber 300, and the outer wall of the battery 200 is substantially flush with a surrounding portion of the housing 104.

Figure 10:
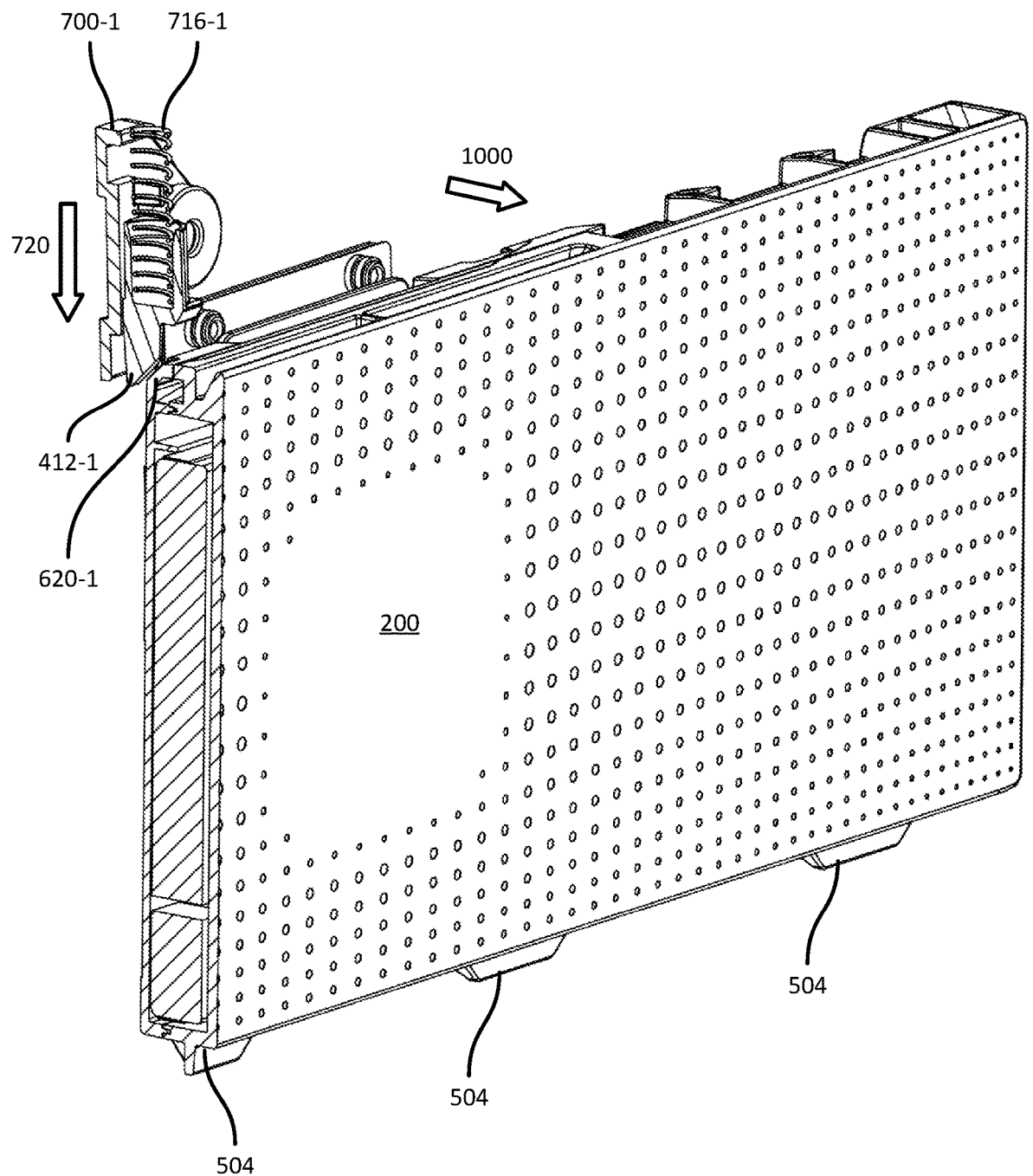
FIG. 10 is a cross section of the battery of FIG. 5 and a lifting element of the latching assemblies shown in FIGS. 7A and 7B.

FIG. 10 illustrates a cross section of the battery 200, along with the lifting element 412-1, following release of the latches 204 (that is, movement of the latches 204 to the unlatched position). When the latches 204 are released, the battery 200 is permitted to move within the chamber 300 (to a degree limited by the auxiliary retainers 408), and therefore no longer restricts the movement of the lifting elements 412. The lifting element 412-1 therefore, under the action of the bias element 716-1, extends in the direction 720 into the chamber 300, and engages with the strike surface 620-1 of the battery 200. As a result, the lifting element 412-1 (along with the lifting element 412-2, which makes a similar motion) lifts the battery 200 away from the inner wall 308 of the chamber 300, e.g., pivoting the battery 200 in a direction 1000 about an axis defined by the protrusions 504 (which remain engaged with the recesses 316).

Figure 11:
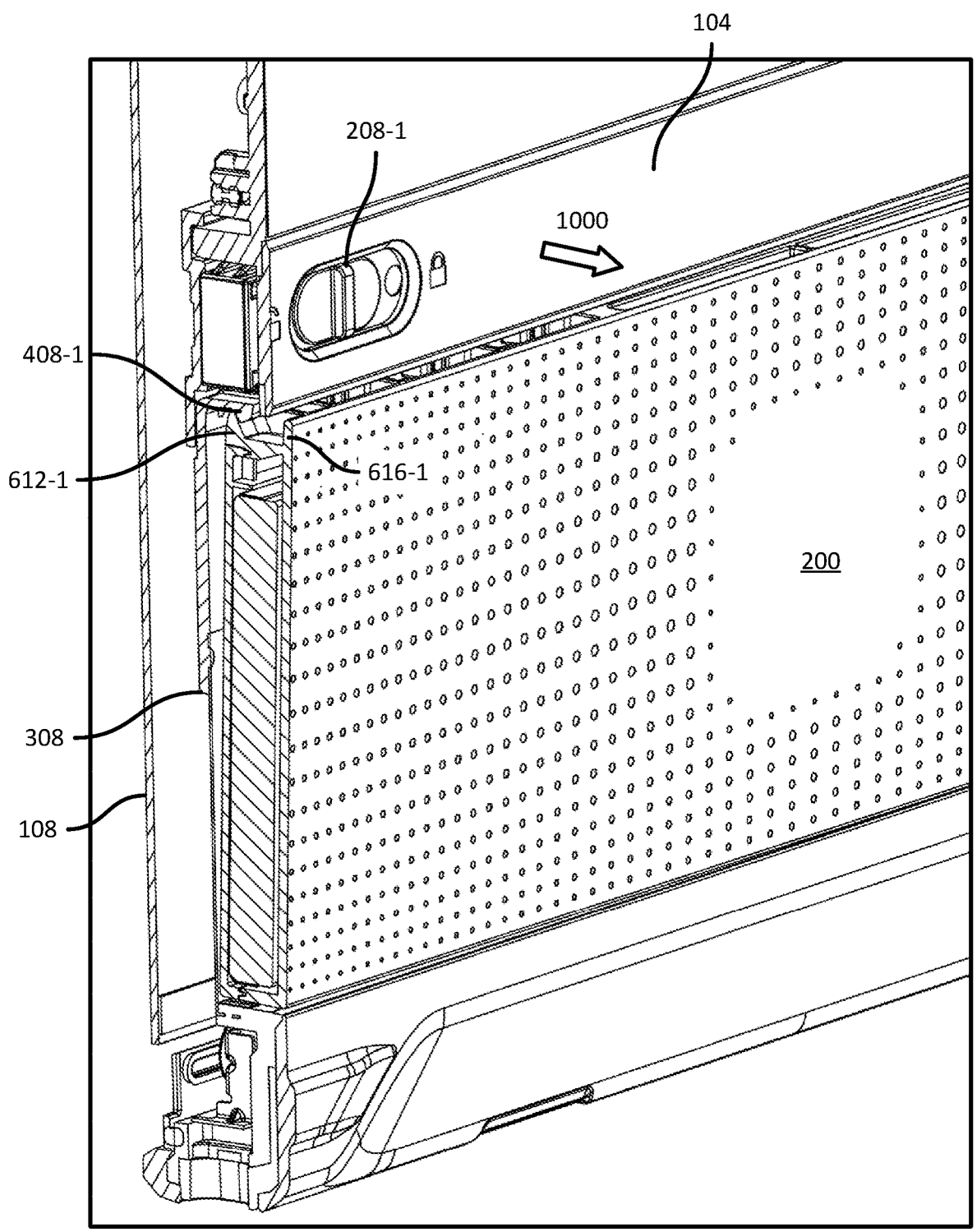
FIG. 11 is a partial cross section of the mobile computing device of FIG. 1, with the battery pack in an intermediate position following unlatching of the latches.

FIG. 11 illustrates a cross section at the plane S9, following release of the latches 204. Under the action of the lifting elements 412 (and/or, in some cases, gravity, e.g., if the device 100 is tilted such that the battery 200 faces downwards), the battery 200 pivots away from the inner wall 308 of the chamber 300. The battery 200 is prevented from falling out of the chamber 300, however, by the auxiliary retainers 408 and the retaining walls 612. As shown in FIG. 11, the retaining walls 612 engage with the auxiliary retainers 408 to retain the battery 200 in an intermediate position. In the intermediate position shown, the battery 200 is not fully engaged with the device 100. For example, the contacts 304 and 604 may be disengaged, such that the battery 200 no longer delivers power to the device 100.

Figure 12:
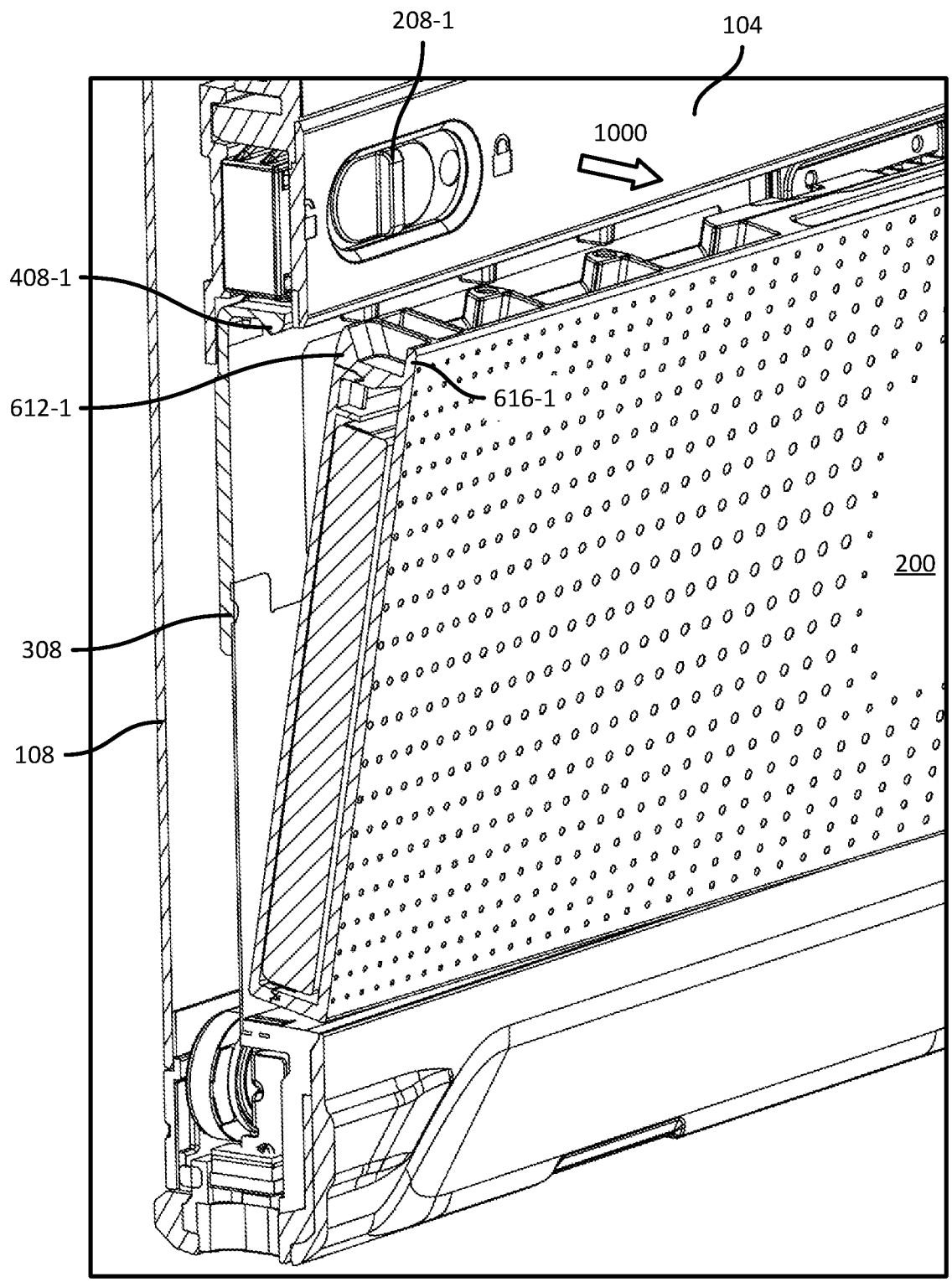
FIG. 12 is a partial cross section of the mobile computing device of FIG. 1, with the battery pack being removed from the device.

To remove the battery 200 from the chamber 300, the ledges 616 can be grasped, e.g., by an operator of the device 100, and pulled in the direction 1000. Either or both of the auxiliary retainers 408 and the retaining walls 612 are resiliently deformable (e.g., being made of rubber or other suitable resilient material), and pulling on the battery 200 (e.g., via the ledges 616) therefore deforms the auxiliary retainers 408, the retaining walls 612, or both, breaking the engagement between the auxiliary retainers 408 and the retaining walls 612, and permitting withdrawal of the battery 200 from the chamber 300, as shown in FIG. 12. As will be apparent from the above discussion, installation of a battery is performed by placing the protrusions 504 in the recesses 316, and then rotating the battery 200 into the chamber 300. Applying pressure deforms the auxiliary retainers 408 and/or retaining walls 612 to fully insert the battery 200 into the chamber 300, pushing the lifting elements 412 into the retracted, or idle, position. The latches 204 are shifted to the unlatched position upon contact with the battery 200, and return to the latched position when the battery 200 is fully inserted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
   a housing defining a battery chamber;
   an electrical contact disposed on a wall of the battery chamber;
   a latch extending into the battery chamber, the latch movable between (i) a first position to retain a battery pack within the battery chamber and engage the battery pack with the electrical contact, and (ii) a second position to permit removal of the battery pack from the chamber;
   an auxiliary retainer in communication with the battery chamber, the auxiliary retainer configured to retain the battery pack within the battery chamber, independently of the latch, via engagement with a complementary retaining structure of the battery pack.

2. The computing device of claim 1, wherein the latch is biased to the first position.

3. The computing device of claim 2, further comprising:
   a bias member coupled between the latch and an internal body of the computing device to bias the latch to the first position.

4. The computing device of claim 1, wherein the latch extends into the battery chamber from a side wall of the battery chamber; and
   wherein the computing device includes a latch actuator disposed on a rear wall of the housing adjacent to the battery chamber.

5. The computing device of claim 4, wherein the housing defines a recess in a side wall of the battery chamber opposite the latch, configured to receive a protrusion of the battery pack.

6. The computing device of claim 4, wherein the latch actuator is affixed to the latch.

7. The computing device of claim 1, wherein the auxiliary retainer includes a resiliently deformable hook extending from a side wall of the battery chamber into the battery chamber to engage with the complementary retaining structure, the auxiliary retainer being deformable to permit passage of the complementary retaining structure.

8. The computing device of claim 1, further comprising:
a lifting member movable between a lifting position extending into the battery chamber, and an idle position retracted from the battery chamber;
wherein the lifting member is configured to lift the battery pack outwards from the battery chamber when the latch is in the second position.

9. The computing device of claim 8, wherein the lifting member extends into the battery chamber from a side wall of the battery chamber, the lifting member including a wedge-shaped head configured to engage with an inclined strike surface of the battery pack.

10. The computing device of claim 8, further comprising a bias member configured to bias the lifting member to the lifting position.

11. The computing device of claim 1, wherein the auxiliary retainer is disposed adjacent to a first side of the battery chamber; the computing device further comprising a further auxiliary retainer disposed adjacent to a second side of the battery chamber opposite the first side.

12. A system, comprising:
a battery pack including:
  a body containing one or more battery cells;
  a hook extending from the body; and
  a retaining wall extending from the body; and
a computing device including:
  a housing defining a battery chamber configured to removably receive the battery pack;
  a latch extending into the battery chamber, the latch movable between (i) a first position to engage with the hook to retain the battery pack within the battery chamber and engage the battery pack with the electrical contact, and (ii) a second position to disengage from the battery pack; and
  an auxiliary retainer in communication with the battery chamber, the auxiliary retainer configured to engage with the retaining wall to retain the battery pack within the battery chamber, independently of the latch, via engagement with a complementary retaining structure of the battery pack.

13. The system of claim 12, wherein the computing device housing includes a recess in a lower wall of the battery chamber; and
wherein the battery pack includes a protrusion receivable in the recess.

14. The system of claim 12, wherein the battery includes a ledge extending from the body.

15. The system of claim 14, wherein the ledge is adjacent to the retaining wall.

16. The system of claim 12, wherein at least one of the auxiliary retainer and the retaining wall is resiliently deformable.

17. The system of claim 12, wherein the computing device further comprises a lifting member movable between a lifting position extending into the battery chamber, and an idle position retracted from the battery chamber.

18. The system of claim 17, wherein the battery further comprises a strike surface configured to engage with the lifting member.

* * * * *